United States Patent
Johansson

(10) Patent No.: US 7,029,521 B2
(45) Date of Patent: Apr. 18, 2006

(54) PROCESS AND DEVICE IN CONNECTION WITH THE PRODUCTION OF OXYGEN OR OXYGEN ENRICHED AIR

(75) Inventor: Thomas Johansson, Höganäs (SE)

(73) Assignee: Ifo Ceramics Aktiebolag, Bromolla (SE)

( * ) Notice: Subject to any disclaimer, the term of this patent is extended or adjusted under 35 U.S.C. 154(b) by 0 days.

(21) Appl. No.: 10/492,118

(22) PCT Filed: Sep. 23, 2002

(86) PCT No.: PCT/SE02/01712

§ 371 (c)(1),
(2), (4) Date: Apr. 9, 2004

(87) PCT Pub. No.: WO03/031328

PCT Pub. Date: Apr. 17, 2003

(65) Prior Publication Data

US 2005/0061148 A1 Mar. 24, 2005

(30) Foreign Application Priority Data

Oct. 11, 2001 (SE) .................................... 0103386

(51) Int. Cl.
*B01D 53/047* (2006.01)

(52) U.S. Cl. ............................ 96/128; 95/130; 96/130; 96/146; 96/153; 96/154

(58) Field of Classification Search ............ 95/96–106, 95/113–118, 130; 96/108, 143, 125–128, 96/130–133, 144, 150, 153, 154, 146

See application file for complete search history.

(56) References Cited

U.S. PATENT DOCUMENTS

| | | | | |
|---|---|---|---|---|
| 3,542,525 A | * | 11/1970 | Pigford et al. | 210/672 |
| 3,702,525 A | * | 11/1972 | Simonet et al. | 95/97 |
| 3,944,400 A | * | 3/1976 | Bird | 95/11 |
| RE29,941 E | * | 3/1979 | Bird | 95/96 |
| 4,165,972 A | * | 8/1979 | Iles et al. | 95/26 |
| 4,299,596 A | * | 11/1981 | Benkmann | 95/100 |
| 4,350,501 A | * | 9/1982 | Bannon | 95/98 |
| 4,715,867 A | * | 12/1987 | Vo | 95/101 |
| 4,732,578 A | * | 3/1988 | Benkmann | 95/22 |
| 5,328,503 A | * | 7/1994 | Kumar et al. | 95/101 |

(Continued)

FOREIGN PATENT DOCUMENTS

EP 0 343 799 A2 11/1989

(Continued)

*Primary Examiner*—Robert H. Spitzer
(74) *Attorney, Agent, or Firm*—Joseph T. Leone, Esq.; DeWitt Ross & Stevens S.C.

(57) ABSTRACT

Process in conjunction with the production of oxygen (22), wherein incoming air (10, 16, 16a, 16b,) is brought to pass through a sorbent/zeolite structure (18), which comprises at least three zeolite units (50a–f) intermittently operated in a first stage comprising adsorption of nitrogen from the air and a second stage comprising desorption (20, 20a, 20b) of thus adsorbed nitrogen. At least two of the zeolite units are operated in the adsorption stage, the incoming air being brought to pass consecutively (53a) through the at least two zeolite units to form an increasing nitrogen gradient; and/or at least two units of the zeolite units are operated in the desorption stage, a pressure being released and/or a desorbing gas (22a, 22b) being brought to pass consecutively (53b) through the at least two zeolite units to form a decreasing nitrogen gradient in the zeolite units.

5 Claims, 9 Drawing Sheets

U.S. PATENT DOCUMENTS

Figure 1:
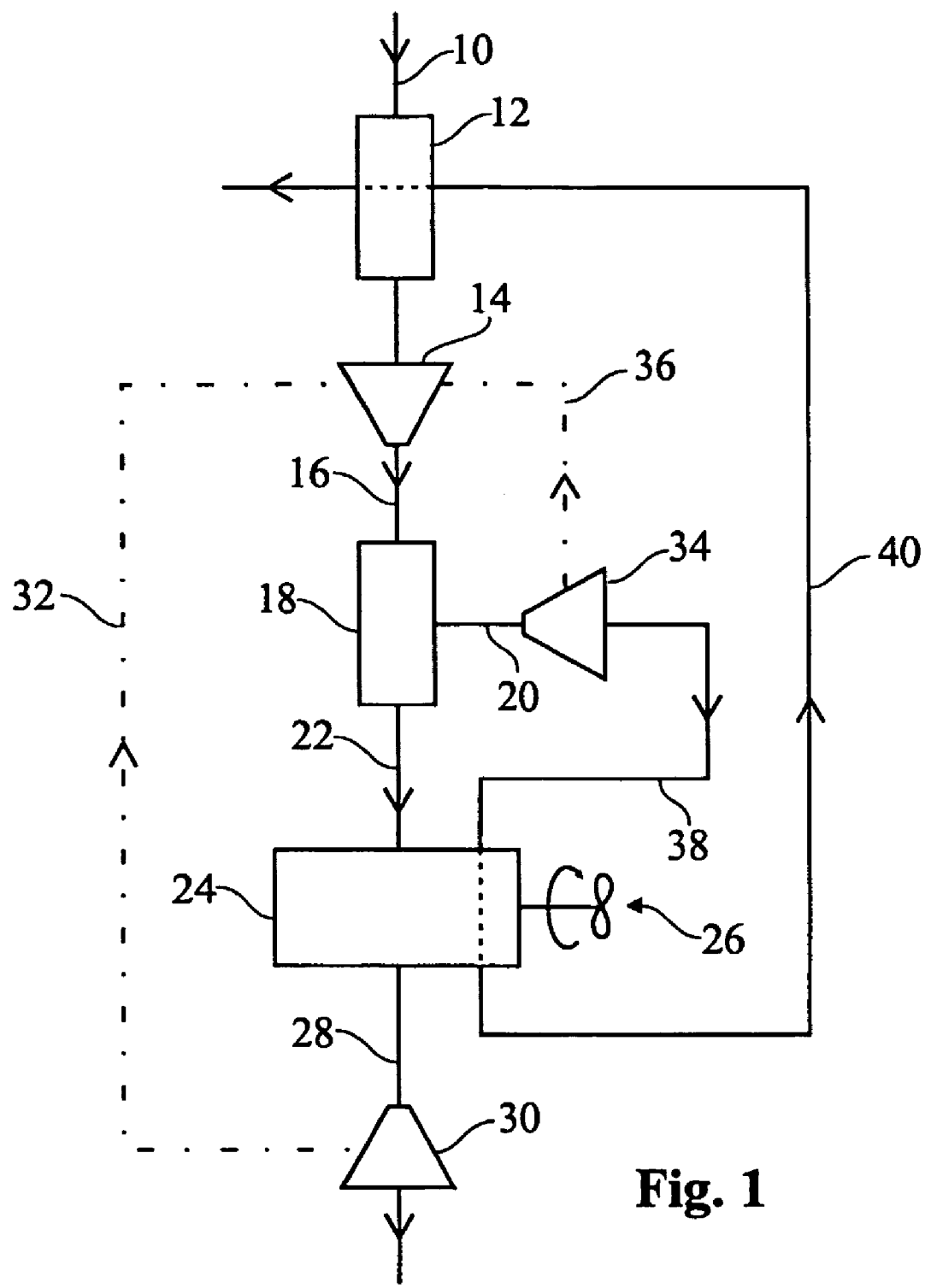

| | | | |
|---|---|---|---|
| 5,382,280 A * | 1/1995 | Choe et al. | 95/98 |
| 5,487,775 A * | 1/1996 | LaCava et al. | 95/98 |
| 5,755,856 A * | 5/1998 | Miyake et al. | 95/101 |
| 5,906,673 A * | 5/1999 | Reinhold et al. | 95/45 |
| 5,985,003 A | 11/1999 | Hayashi et al. | |
| 6,319,303 B1 * | 11/2001 | Guillard et al. | 95/97 |
| 6,475,265 B1 * | 11/2002 | Baksh et al. | 95/96 |
| 6,514,318 B1 * | 2/2003 | Keefer | 95/96 |
| 6,641,645 B1 * | 11/2003 | Lee et al. | 95/98 |
| 6,752,851 B1 * | 6/2004 | Kawai et al. | 95/96 |
| 2004/0069143 A1 * | 4/2004 | Sumida et al. | 95/96 |

FOREIGN PATENT DOCUMENTS

| | | |
|---|---|---|
| EP | 0350677 A1 * | 1/1990 |
| EP | 0537597 A1 * | 4/1993 |
| EP | 0 598 321 A1 | 5/1994 |
| GB | 1 551 824 A | 9/1979 |
| GB | 2281229 A * | 3/1995 |
| JP | 3-94809 A * | 4/1991 |

* cited by examiner

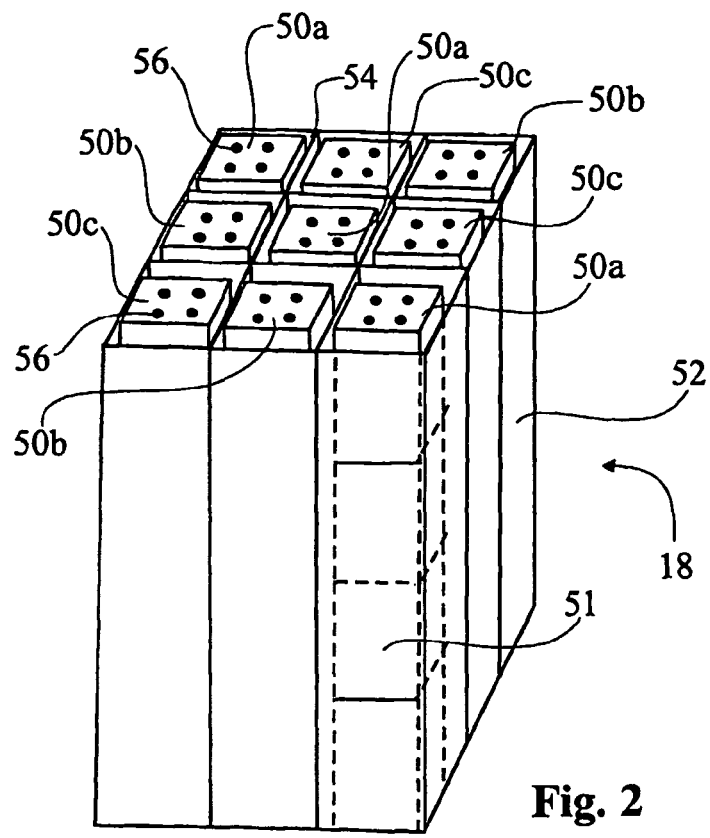
Fig. 2
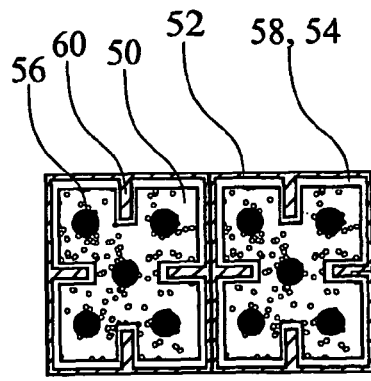
Fig. 3A
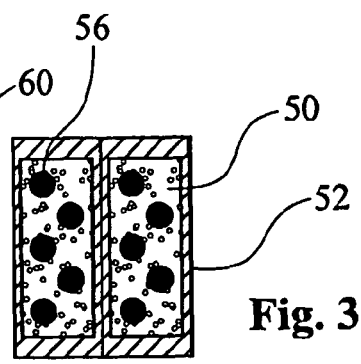
Fig. 3B
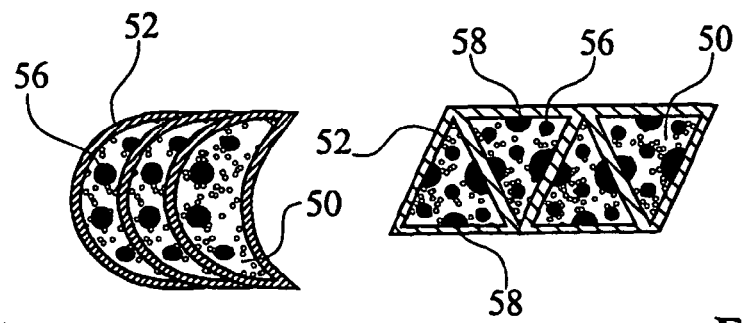
Fig. 3C
Fig. 3D

PROCESS AND DEVICE IN CONNECTION WITH THE PRODUCTION OF OXYGEN OR OXYGEN ENRICHED AIR

TECHNICAL FIELD

The present invention relates to the production of oxygen or oxygen enriched air, in which process incoming air is brought to pass through a structure of sorbent material, i.e. zeolite or other material with similar nitrogen and oxygen adsorbing properties, in the following referred to as "zeolite", which zeolite structure comprises at least three zeolite units, which zeolite units are intermittently operated in a first and a second stage, said first stage comprising adsorption of nitrogen from the air and said second stage comprising desorption from the zeolite unit of thus adsorbed nitrogen.

BACKGROUND OF THE INVENTION

The production of oxygen or oxygen enriched air by nitrogen adsorption in zeolites is a well developed technical field. Different types of zeolites exist and a number of them have been developed especially for the production of oxygen or oxygen enriched air. Naturally, there has also been suggested a number of ways to utilize the oxygen or oxygen enriched air which is produced. In WO 99/49964 there is for example described the use of nitrogen adsorbing zeolites in respiratory air devices or in air-conditioning units. Still, nitrogen adsorbing zeolites have a potential for new uses within new technical fields.

Moreover, although the production of oxygen or oxygen enriched air by nitrogen adsorbing zeolites is a well developed technical field, there is a potential for further development of this technique. The zeolite structures used today e.g. often exhibit a limited effectiveness due to decreased reaction (i.e. adsorption or desorption) rates, which in turn depends on excessive production or consumption of heat during the reactions. More precisely, the adsorption of nitrogen takes place during increase of pressure and increase of temperature. When the temperature becomes too high however, the rate of the adsorption reaction decreases. Moreover, the desorption of nitrogen normally takes place during decrease of pressure and decrease of temperature. When the temperature becomes too low however, the rate of the desorption reaction decreases. A reason for this being a problem is that zeolites exhibit a poor thermal conductivity, which means that the temperature within a zeolite structure quite fast will rise or decrease to a temperature at which the reaction rate is negatively effected.

Yet another problem is to accomplish an effective process utilising several zeolite units, i.e. how to make best use of the zeolite material, considering its adsorption properties and functionality when close to saturation, in a process which utilises at least three zeolite units consecutively, operatively connected to each other.

EP 0 343 799 teaches a process in which two or more sorbent units/beds are intermittently operated in an adsorption stage and a desorption stage, heat being transferred between the units/beds during operation. Likewise, U.S. Pat. No. 4,165,972 and EP 0 537 597 teach heating and cooling by use of heat exchanger means. EP 0 537 597 also teaches that in very large size air separation plants, several adsorbent beds may be connected for parallel flow in one processing bank, in which case all of the beds will go through the same processing sequence together and simultaneously. Hence, the plurality of beds are not serially interlinked to each other.

DESCRIPTION OF THE INVENTION

The present invention aims at addressing the above problems and thus to offer new design and technique for nitrogen adsorbing zeolites or other materials (sorbent materials) with similar nitrogen and oxygen adsorbing properties as the zeolites used today for production of oxygen or oxygen enriched air. In the following text this group of materials will only be referred to as "zeolite" or "zeolites". Thus, by introduction of serially (consecutively) interlinked zeolite units operating in a certain sequence, the present invention aims at offering a new and highly efficient process and device in connection with the production of oxygen or oxygen enriched air by aid of nitrogen adsorbing zeolites. Moreover, the present invention aims at offering a device which is at least as efficient as known devices but which is smaller in size. By new design and technique the problems related to diminished reaction rates due to excessive production or consumption of heat are solved too. Moreover, the present invention aims at offering a new utilisation for oxygen or oxygen enriched air produced by nitrogen adsorbing zeolites.

These and other problems are solved by the process and device presented in the claims.

Accordingly, there is presented a process and device according to the introduction, in which:

a) at all instances during operation at least one but not all of said at least three zeolite units is operating in the first, adsorption stage, the rest of said at least three zeolite units being operating in the second, desorption stage or vice versa; and in which either or both of cases b and c is valid at all instances during operation:

b) at least two of said three zeolite units are operated in said first, adsorption stage, said incoming air, at a pressure close to or above, preferably well above, atmospheric pressure, being brought to pass consecutively through said at least two zeolite units to form a nitrogen gradient which is largest in an upstream air inlet unit and lowest in a downstream oxygen or oxygen enriched air outlet unit of said consecutive units;

c) at least two of said three zeolite units are operated in said second, desorption stage, a pressure being released and/or a desorbing gas being brought to pass consecutively through said at least two zeolite units to form a nitrogen gradient which is lowest in an upstream desorbing gas inlet unit and largest in a downstream nitrogen or nitrogen enriched gas outlet unit of said consecutive units.

Hence, the invention offers a way of serially or sequentially interlinking the zeolite units so that each single unit first operates at a low nitrogen saturation, then at a higher nitrogen saturation etc., until a final, chosen saturation point is reached at which instance desorption is commenced for that unit. At every instance the incoming air is led to a zeolite unit which has a high (preferably the highest) degree of nitrogen saturation which zeolite unit thereafter, in the next step, switches to desorption mode in which nitrogen or nitrogen enriched air is taken out (outlet) from the zeolite unit having a high degree of nitrogen saturation. Oxygen or oxygen enriched air is taken out (outlet) from a zeolite unit which at the moment is last in line of the sequentially interlinked adsorbing units, which zeolite unit has a low degree of nitrogen saturation. In the step before, that zeolite unit, having a low degree of nitrogen saturation, was first in line of the sequentially interlinked desorbing units. Here, "last in line" and "first in line" refers to the position in the series of zeolite units with respect to gas flow (either air to be deprived of nitrogen during adsorption or desorbing gas to be enriched with nitrogen during desorption).

According to one aspect of the invention, the zeolite structure comprising the zeolite units, may be arranged to comprise a revolving unit of zeolite units. In this case, the incoming air may be led in counter current through a number of zeolite units. At certain intervals, the revolving unit moves one step, which means that the zeolite unit which is saturated the most with nitrogen moves into desorption position where it is last in line of a number of zeolite units under desorption. Air, oxygen or oxygen enriched air is led in counter current through these desorbing units and the units move one step at a time and are finally conveniently desorbed whereafter they once again enter the adsorption section of the revolving unit.

According to another aspect of the invention, heat energy is transferred from each zeolite unit during the adsorption stage and heat energy is transferred to the zeolite unit during the desorption stage. Preferably, said heat energy which is transferred from the adsorption stage is transferred by aid of a cooling medium and said heat energy which is transferred to the desorption stage is transferred by aid of a heating medium. The heating medium may be the same as the cooling medium in case of heat exchanging between adsorbing and desorbing zeolite units, or different media may be used. Any extra heat energy needed may come from an external heating media such as exhaust gases from a process in which the oxygen or oxygen enriched air is used or from some other source of heat. Any extra cooling effect needed may come from an external cooling media such as surrounding air, cooling water or any other suitable cooling source. One option is to cool the incoming air to constitute a cooling medium in the zeolite units and/or to heat the incoming desorbing gas to constitute a heating medium. Of course external heating and cooling media may be used even if no heat exchanging takes place.

According to another aspect of the invention, the zeolite structure comprises at least four separate zeolite units, preferably at least six, even more preferred at least nine separate units. These separate units are operated alternatingly for the adsorption stage and desorption stage, respectively, by a pressure change process and/or by a temperature change process, preferably by a temperature change process. It is to be understood that there is no upper limit on the number of zeolite units used in a single process or device, especially since it is preferred that each zeolite unit is quite small. Thus, it is preferred that each single zeolite unit is shaped as an elongated body, which preferably has a largest diameter or cross-sectional width of 1–1000 mm, more preferred 2–100, even more preferred 2–50 mm and most preferred 2–10 mm, and which preferably has a length of 100 mm–100 m, more preferred 150 mm–10 m, even more preferred 200 mm–5 m and most preferred 200 mm–1 m. Moreover, each zeolite unit can be built up from a great number of smaller pieces which exhibit a more symmetric shape and which are stacked on each other in order to form said elongated zeolite units. Preferably said elongated bodies exhibit a peripheral length which is greater than the peripheral length of a rod with a circular cross-section, which rod has a cross-sectional area equal to the cross-sectional area of the elongated bodies. According to a preferred embodiment of the invention, the elongated bodies are closely stacked or in some other way arranged in close relation to each other, thus enabling and facilitating heat exchanging between bodies/units currently operating in the adsorption stage and the desorption stage, respectively. As an alternative, smaller zeolite objects such as balls or other small pieces may, arranged in bulk, form a zeolite unit. In the most preferred case, any transferring of heat energy to and from the zeolite units is effected solely, or at least in the main, by heat exchanging between adsorbing and desorbing zeolite units.

Thanks to the relatively small, or at least relatively thin, zeolite units, the reaction rate in the units may thus be ameliorated by heat exchanging being performed between the adsorbing and desorbing zeolite units at each instance of the process. This of course means that some type of means for heat exchanging between the zeolite units preferably should exist, but the negative effect of the low thermal conductivity is never the less counter-acted by the fact that the zeolite units are so thin. The means for heat exchanging could preferably and quite simply consist of a metal layer and/or a metal ledge arranged between the separate zeolite units. Other means, per se known, means for heat exchanging may however also be used.

According to yet another aspect of the invention, the zeolite units are arranged in a metal structure, each zeolite unit preferably being arranged in a cell of its own in the metal structure, and additional means for said heat exchanging preferably also being arranged within the metal structure. Moreover there may be arranged through channels for the passing through of the gas arranged between the outer surface of the zeolite units and the metal structure. Alternatively or in combination, the zeolite structure may comprise a honeycomb structure, by which through-holes are provided in the zeolite structure for the passing through of the gas. The details of these aspects will be more thoroughly described in the description of the drawings.

According to one embodiment of the invention, the process is pressurised, whereby the desorption process comprises a first step in which pressure is released for the desorption of nitrogen from the zeolite and a second step in which air, oxygen or oxygen enriched air is brought to flush through the zeolite in order to wash out adsorbed nitrogen from the zeolite, whereby said separate zeolite units are operated alternatingly for adsorption, for the first step of desorption and for the second step of desorption, respectively. In the following, the second step will be referred to as a regeneration step. The prevailing peak pressure during the process and in the device according to the invention should in this embodiment be e.g. at least 1.5 bar, preferably at least 2.5 bar, more preferably at least 5 bar, even more preferred at least 7.5 bar and most preferred at least 10 bar over-pressure. It is conceivable that, for certain embodiments and uses of the invention, the pressure may be as much as 100 bar, but normally it will not exceed 50 bar and preferably not exceed 30 bar over-pressure.

According to one aspect of the just mentioned embodiment, the transferring of heat energy according to the invention may be performed by aid of heat pump process, optionally a von Platen process, operating with adsorbing zeolite units as a source of heat energy and desorbing zeolite units as heat energy sinks.

According to another embodiment of the invention, the adsorption and desorption reactions may be ameliorated by performing alternating cooling and heating, to such an extent that the process may be performed essentially at a constant pressure (disregarding pressure differences necessary to overcome a flow resistance). If the zeolite units are being cooled enough during adsorption, the amount of nitrogen, which is adsorbed, will be high. The following desorption (including regeneration) of the zeolite units may then be performed by an increase of the temperature only. In this case, the temperature difference between the adsorption step and the desorption step should be at least 5° C., or more conveniently at least 10° C., preferably at least 20° C., more preferred at least 50° C., even more preferred at least 100° C. and most preferably at least 200° C. By creating conditions which thus enable a lower temperature during the adsorption stage and during the desorption stage, according to the just mentioned temperature difference, the rate of the adsorption reaction of the desorption reaction will be immensely increased. The pressure is preferably atmospheric, whereby essentially no compression of the incoming air is needed. However, it is also conceivable to combine a pressure change process and a temperature change process, whereby the temperatures need not, but preferably should, be lower in the adsorption stage than in the desorption stage. In the case of a combined pressure change process and temperature change process, the pressure differences may be up to 100 bar but would normally not exceed 50 bar, preferably not exceed 30 bar and even more preferred not exceed 10 bar. Most beneficially, the temperature change process dominates, in which case the pressure differences do not exceed 2 bar, preferably do not exceed 1 bar, more preferred do no exceed 0.5 bar and most preferred do not exceed 0.2 bar.

According to a preferred embodiment of the invention, the oxygen or oxygen enriched air produced is utilised in the production of energy. The production of energy could be constituted of any production of energy in the group that consists of production of heat, motion and electrical power, preferably in a combustion process and even more preferred in an internal combustion engine. Any conceivable fuel may be used for the combustion process or internal combustion engine, such as, but not excluding others, petrol, diesel, hydrocarbons, gas, rape-oil methyl ester, etc.

According to yet another preferred embodiment of the invention said utilisation in the production of energy and/or in a chemical process constitutes of utilisation of the oxygen or oxygen enriched air as a reactant in a fuel cell, preferably a Solid Oxide Fuel Cell (SOFC). The concept of SOFC is well known in that particular technical field and denotes that the "electrolyte" is in solid form, such as a ceramic electrolyte in the form of e.g. $ZrO_2$ or some other electrically insulating but ion conducting material. The reaction in the fuel cell, in which the oxygen or oxygen enriched air is used, may be any known or yet unknown reaction, e.g. based on hydrogen and oxygen as reactants, on hydrocarbons and oxygen as reactants and/or on carbon monoxide, preferably mixed with hydrogen, and oxygen as reactants. In the latter case, the oxygen or oxygen enriched air produced according to the invention may advantageously be used both as the oxygen reactant in the fuel cell itself and as a reactant for the production of a carbon monoxide and hydrogen gas mixture, in the form of reformed gas. In the per se known production of reformed gas, carbon or hydrocarbons are reformed into carbon monoxide and hydrogen by reaction with steam and/or air. In the present case the reformed gas thus produced, by oxygen or oxygen enriched air rather than plain air as a reactant, will be extra efficient for the production of energy in the fuel cell, since it will exhibit a decreased content of nitrogen ($N_2$) in comparison with reformed gas produced with air as an oxygen source. Moreover, when reformed gas is produced by use of oxygen or oxygen enriched air according to the invention, a relatively larger portion of the oxygen may be added in the form of $H_2O$. This will give an increased content of hydrogen ($H_2$) in the gas produced, which is an advantage, especially for fuel cells. Of course, what has just been said about reactants for fuel cells could also be true for reactants for other chemical processes or processes for the production of energy.

In large vehicles or constructions such as space crafts, trucks or metallurgical, chemical or power plants, zeolite units may be arranged in a number of up to 1,000,000 units in a single zeolite structure. For the use in a conventional automobile or the like, the number of units in a single zeolite structure is preferably less however, giving a total diameter or largest width of the zeolite structure of 300 mm, preferably 200 mm at the most and even more preferred 100 mm at the most.

An advantage of the present invention is that oxygen or oxygen enriched air will, in comparison with air, result in a thinner blocking gas layer where the oxygen is consumed, such as on the surface of something that is combusting or the surface on the oxidising side of a membrane in a fuel cell. As a consequence, the process will be faster and the energy producing device therefore may be smaller than a conventional device.

According to another aspect of the invention, the oxygen or oxygen enriched air produced may be used in any known oxygen consuming process or apparatus, such as for example but not excluding others, respiratory devices.

According to yet another aspect of the invention, the nitrogen desorbed in the process is utilised for cooling purposes, preferably for the cooling of an internal combustion engine, for the cooling of a fuel cell or for cooling of the incoming, optionally compressed, air. This is especially efficient in case the temperature of the nitrogen gas is lowered as its pressure is released. As an alternative, the desorbed nitrogen may be used for drying purposes, preferably for the regenerative drying of a drying substance for the incoming air into the process/device. Such a drying substance may advantageously also be constituted of a zeolite structure, that specific zeolite however being adapted and optimised for adsorption of water or humidity. A particularly interesting concept is to use the low temperature desorbed nitrogen for cooling purposes, such as mentioned above, and thereafter to use the heated nitrogen gas for drying purposes.

According to another preferred embodiment of the invention, the process/device according to the invention is integrated within a turbo process. As this is implemented it would mean that exhaust gases from said production of energy and/or from said chemical process are pressure-released in a turbine, the energy developed in the pressure-releasing being used for the compression of the incoming air for the process/device according to the invention. This will also have the advantage that since the temperature of the exhaust gases is lowered at the pressure-release, the corresponding thermal energy in the gases will be used for the compression of the incoming air for the pressurised embodiment of the process/device according to the invention.

The type of zeolite used should naturally be adapted and optimised (i.e. it should be selective) for the adsorption of nitrogen from air. Moreover, it should preferably be well adapted for the formation of elongated bodies, preferably by extrusion. In the embodiment in which the elongated zeolite bodies are built up from a greater number of shorter or smaller pieces, there may also be used pressing, casting or some other method well suited for the production of compact shaped pieces of zeolite. Also, the zeolite should exhibit a considerable mechanical strength, in order especially to withstand vibrations such as naturally occur in e.g. combustion engines. According to one embodiment of the invention, the zeolite should have a pore structure adapted to minimise the time for adsorption and desorption, respectively, of the nitrogen, while maintaining optimised heat conductivity properties of the zeolite.

DETAILED DESCRIPTION OF THE INVENTION

In the following the present invention will be described in greater detail with reference to preferred embodiments shown in the drawings, of which:

FIG. 1 is schematically, in a block diagram, showing a process for the production of oxygen or oxygen enriched air according to the invention, which process is integrated within a turbo process, FIG. 2 is showing a zeolite structure in a perspective view, which zeolite structure comprises a number of separate, elongated zeolite units arranged in a metal structure.

FIGS. 3A–F are showing, in cross-section, different conceivable designs of the zeolite units according to the invention, and how they are arranged in relation to each other.

Figure 4A:
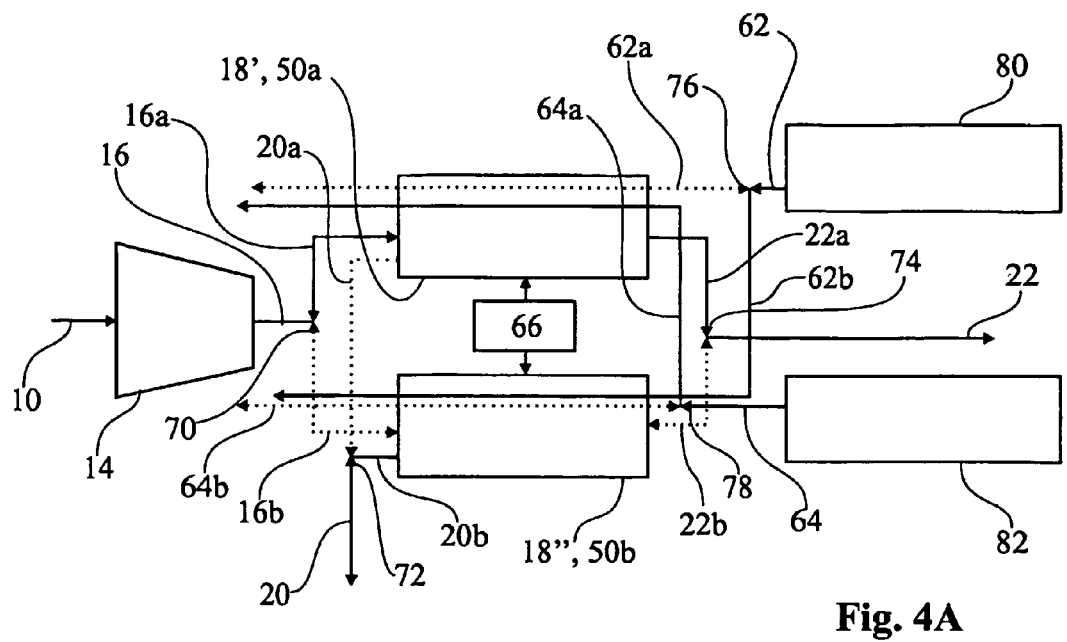
Figure 4B:
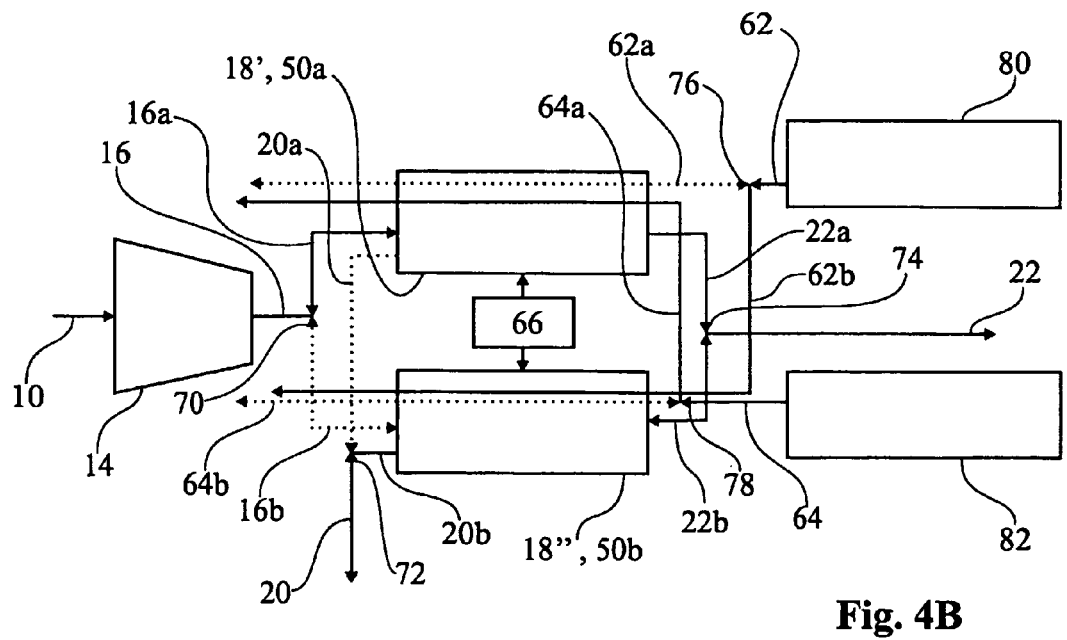
Figure 4C:
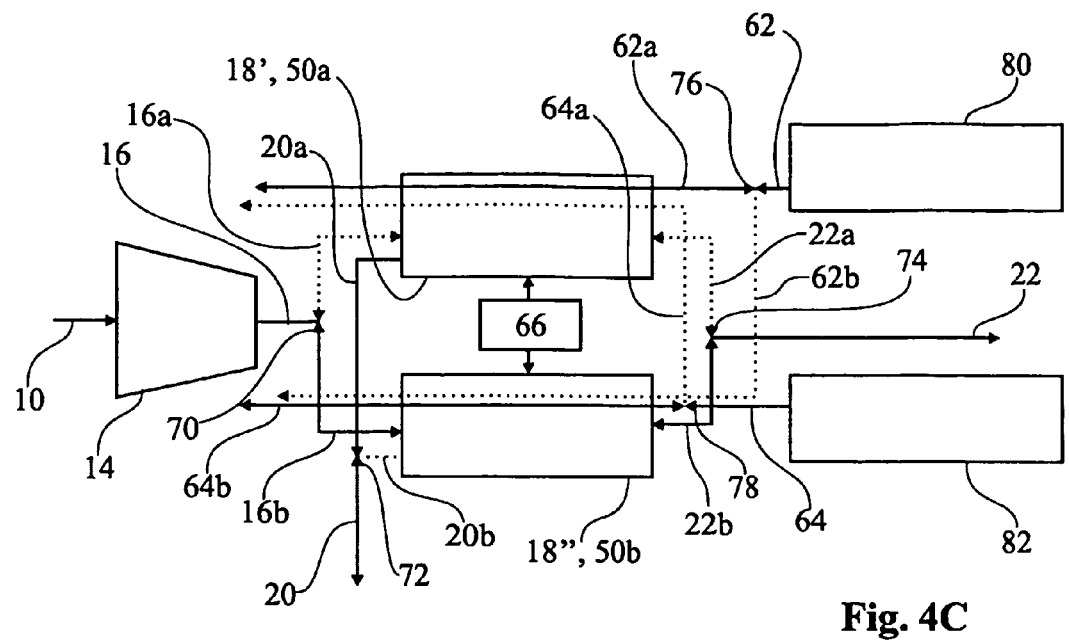
Figure 4D:
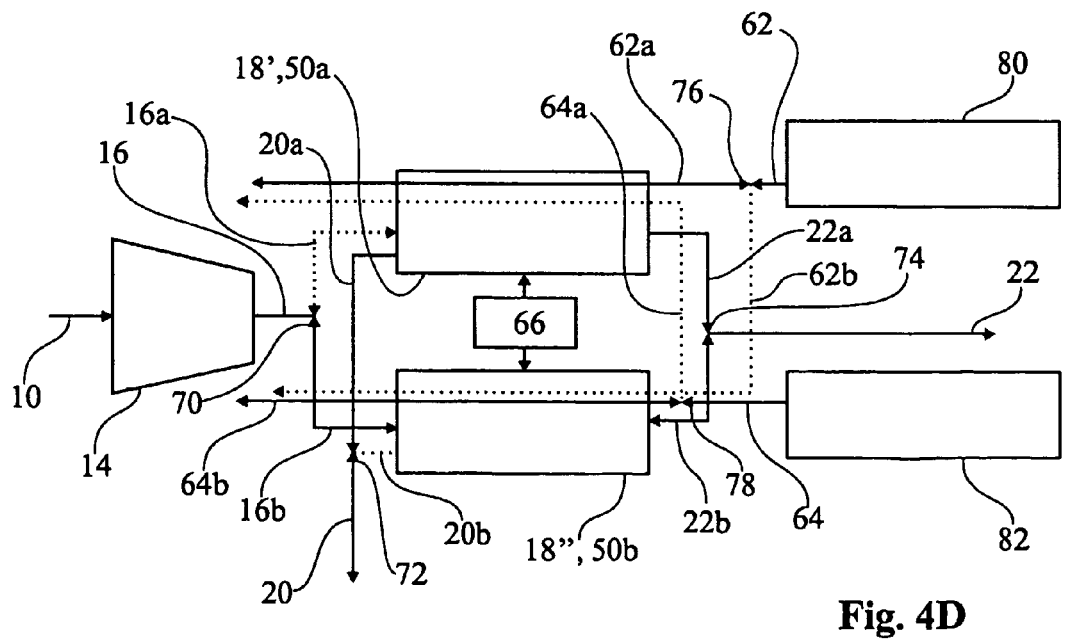
Figure 5A:
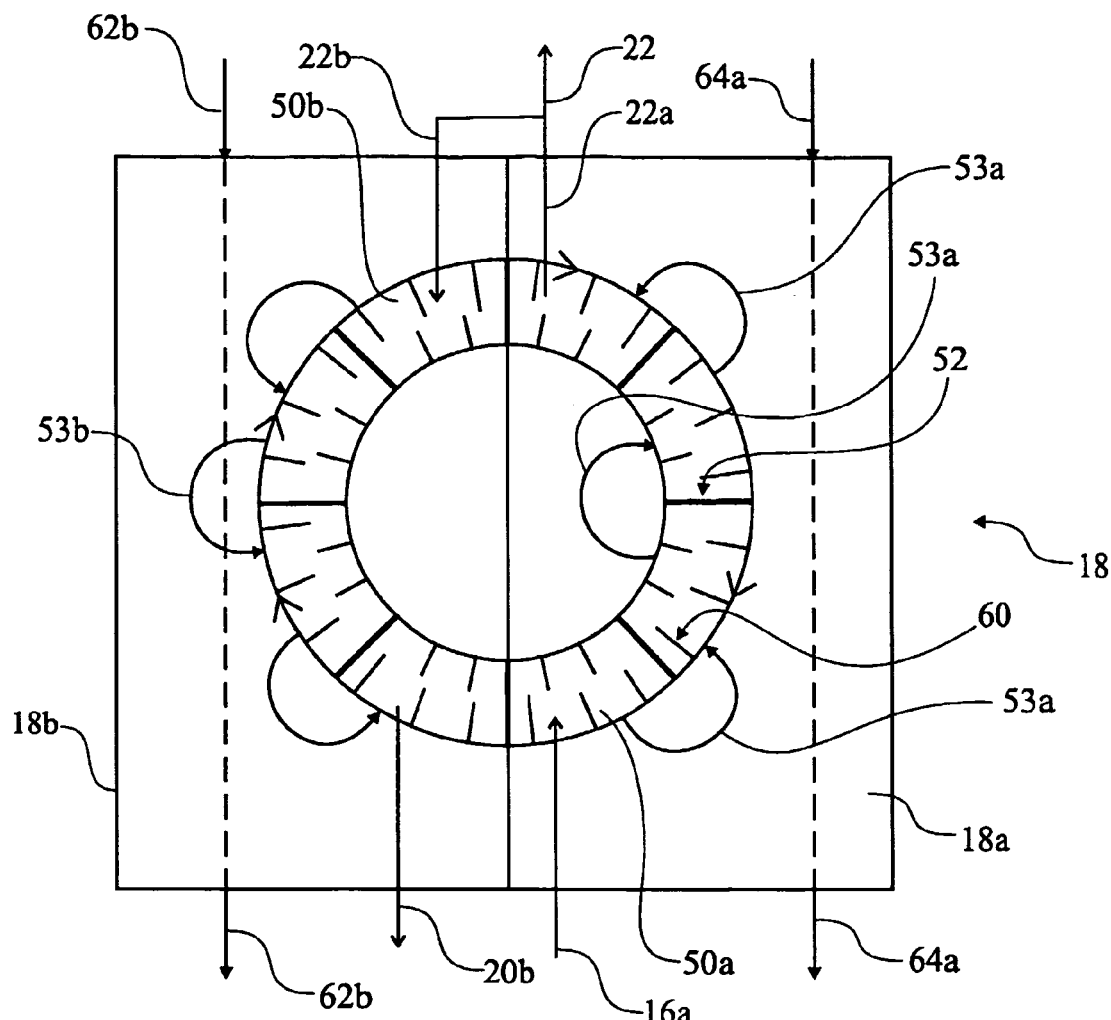
Figure 5B:
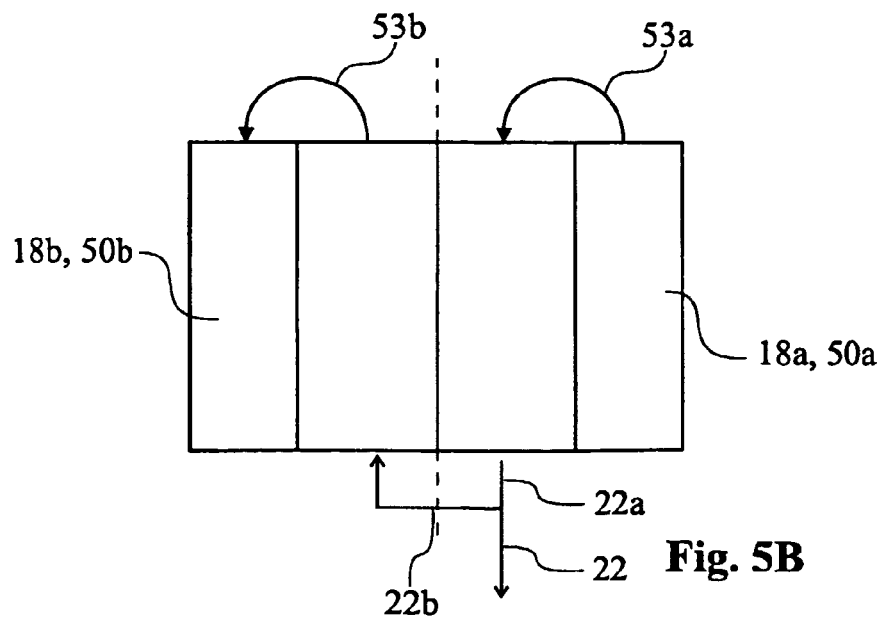
Figure 5C:
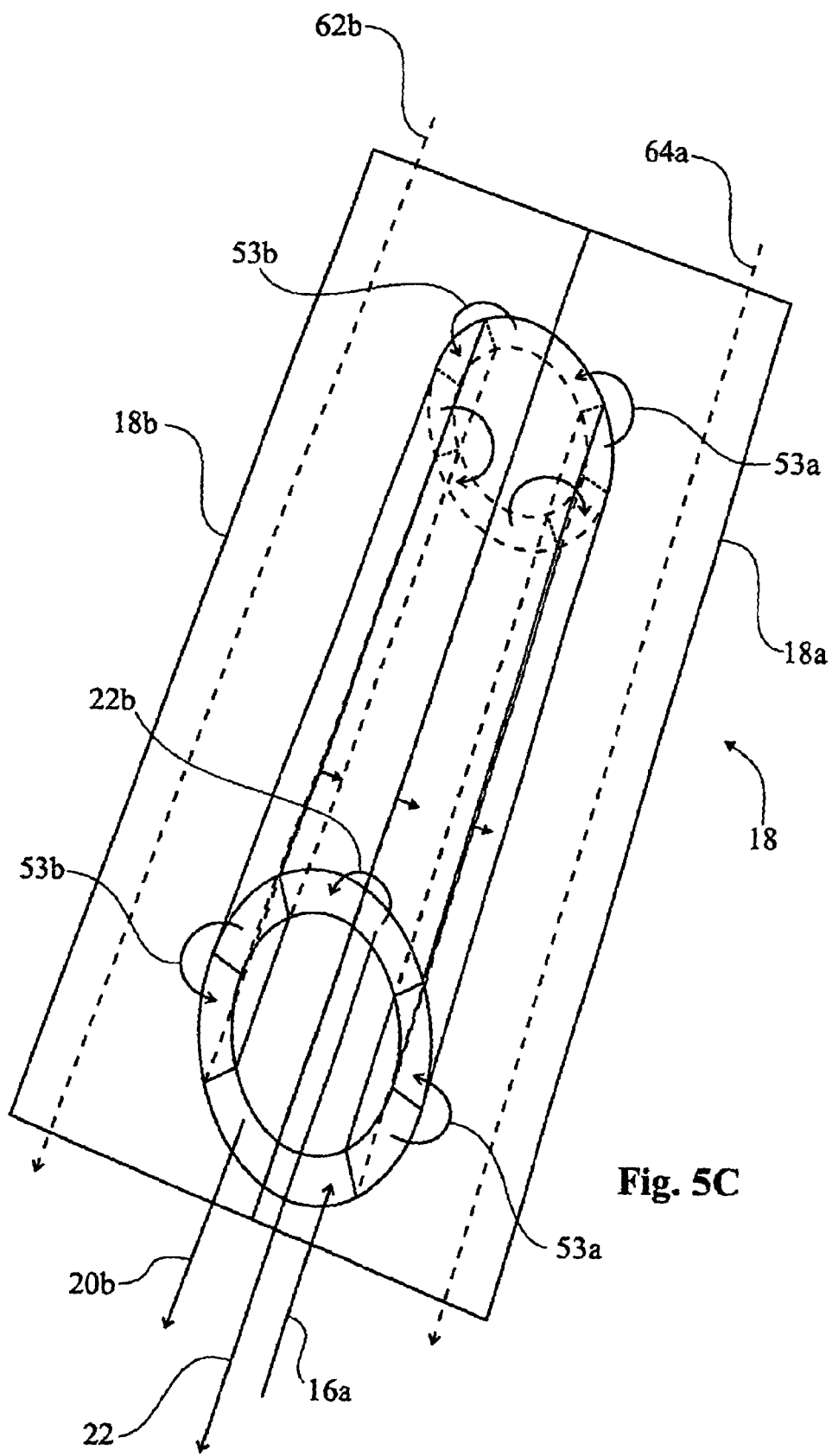
Figure 6A:
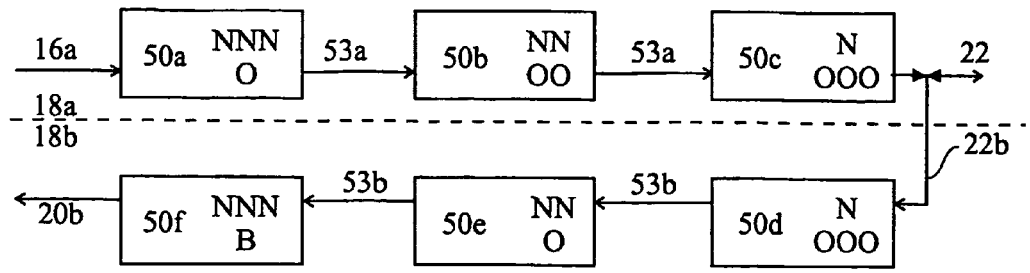
Figure 6B:
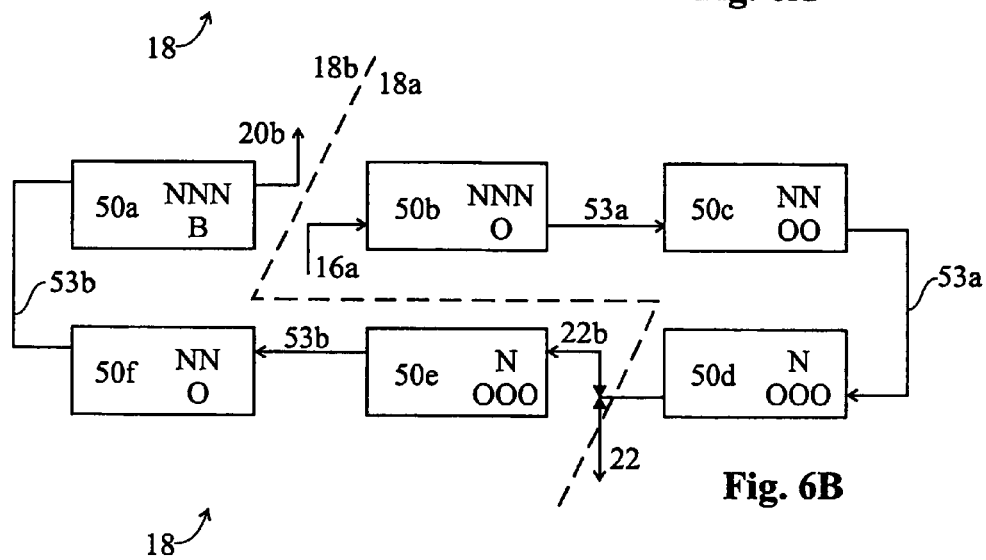
Figure 6C:
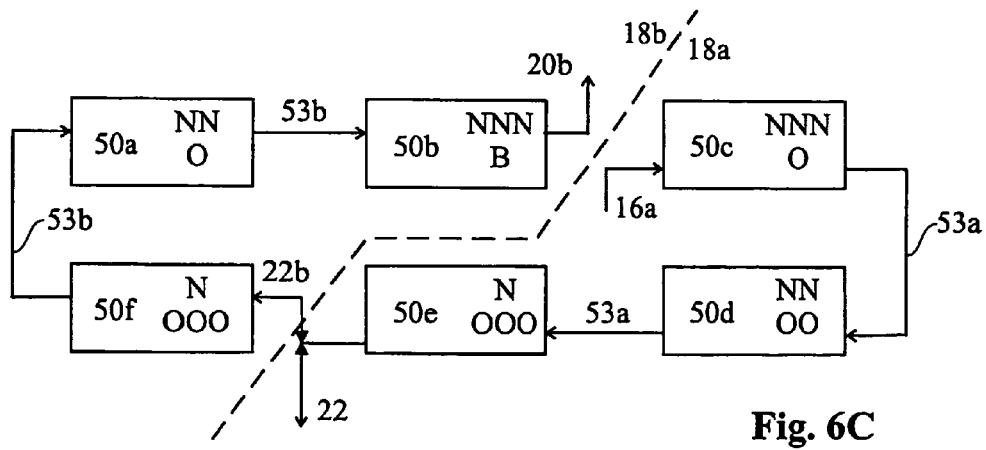
Figure 7B:
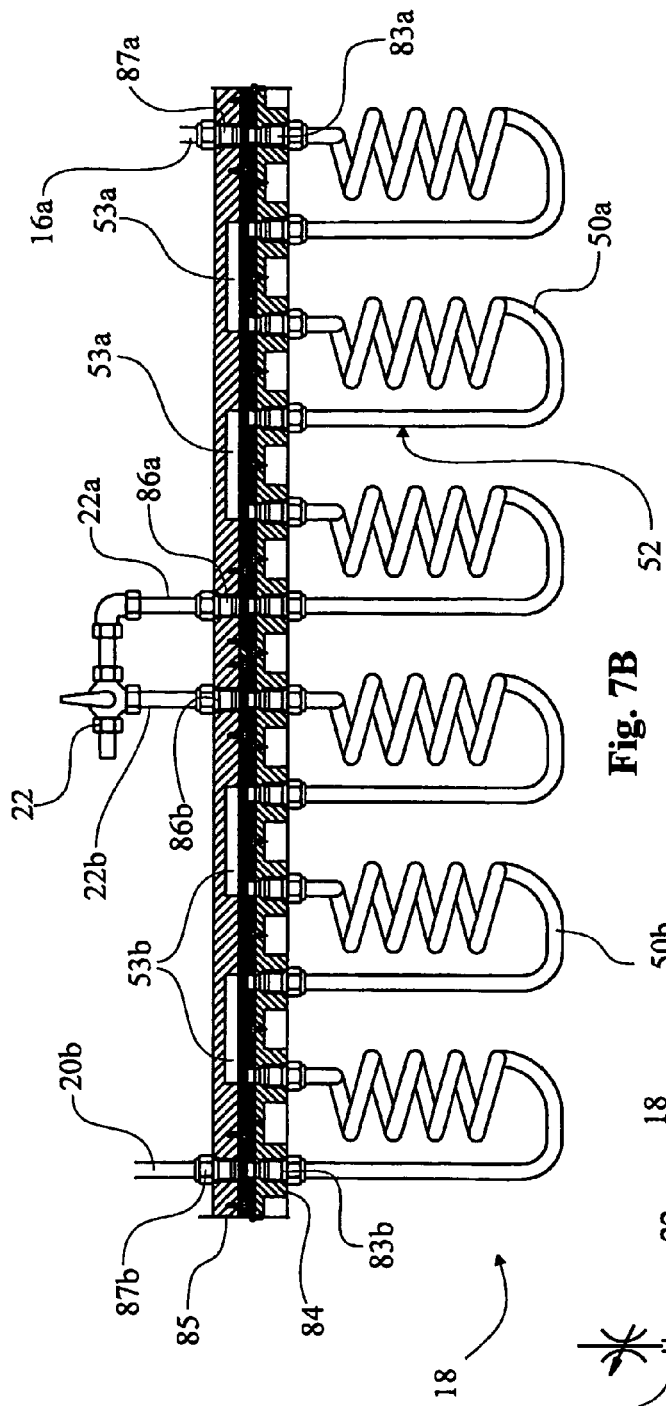
Figure 7A:
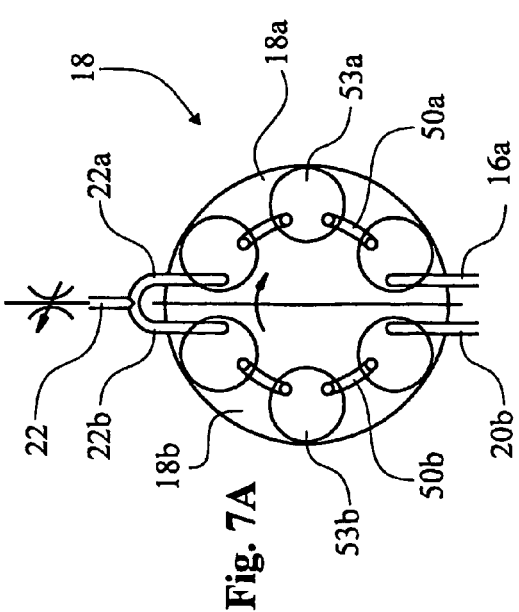

FIGS. 4A–D are showing the stages of alternating heating and cooling of the zeolite units, according to a preferred embodiment of the invention, FIGS. 5A–C are showing an embodiment of the invention, in which the zeolite structure is arranged as a revolving unit, FIGS. 6A–C are showing the concept of the arrangement in FIGS. 5A–C, more generally described, FIGS. 7A–B are showing a prototype of a zeolite structure arranged as a revolving unit.

First, some general aspects of the process and device will be discussed, with reference to FIGS. 1–4. The inventive concept is discussed in more detail with reference to FIGS. 5–6.

In FIG. 1 there is schematically shown a block diagram of a process for the production of oxygen or oxygen enriched air according to the invention. In the process shown, the oxygen or oxygen enriched air is used in the production of energy or in a chemical process. Moreover the process according to the invention is integrated within a turbo process. More precisely, there is shown an intake 10 of air, which is dried in a dryer 12, which dryer advantageously could be based on a zeolite as a drying substance, which zeolite is adapted and optimized for uptake of water or humidity in the air. The dried air is compressed in a compressor 14 to the desired peak pressure for the process, according to the above. As an alternative (not shown), the dryer 12 may be arranged downstream of the compressor 14. The dry and compressed air is thereafter conveyed through an inlet 16 into a zeolite structure 18 according to the invention. In the zeolite structure 18, nitrogen is absorbed from the incoming air. The nitrogen is thereafter intermittently desorbed and is withdrawn from the zeolite structure through an outlet 20.

The zeolite structure 18 exhibits an outlet 22 for the oxygen or oxygen enriched air, which oxygen enriched air has an oxygen content of at least 25%, preferably at least 40% and even more preferred at least 60% and advantageously from 80% up to 100% oxygen or at least up to 95% oxygen. The oxygen or oxygen enriched air is subsequently and according to the invention used for energy production or in a chemical process in a process unit 24. Thus, the process unit 24 of FIG. 1 may symbolise e.g. an internal combustion engine, or fuel cell or else according to the above. The out-take of energy is symbolised at 26. The exhaust gases from the process unit 24 are withdrawn through an outlet 28 and the pressure of the exhaust gases are released in a turbine 30. According to the concept of a turbo, the energy derived when the exhaust gases are pressure-released in the turbine 30 might be utilised for the compression of incoming air in the compressor 14, as symbolised by the line 32. In the same way, the pressurised nitrogen gas (or rather nitrogen enriched air) desorbed and withdrawn from the zeolite structure 18 through the outlet 20, is pressure-released in a turbine 34 and the energy thus derived, symbolised by the line 36, might be utilised in the compressor 14.

When the desorbed nitrogen gas has been pressure-released its temperature will have fallen, which means that it beneficially could be used for cooling purposes. In the case of FIG. 1, the cool nitrogen gas is conveyed in a line 38 to the process unit 24 in order to be used for cooling purposes in the internal combustion engine, the fuel cell or whatever process symbolised by 24. The nitrogen gas will thereby be heated again and may thereafter be used a second time for drying purposes. In FIG. 1 it is shown how the heated nitrogen gas is conveyed in a line 40, back to dryer 12 in order to be used for regenerative drying of a drying substance therein.

In FIG. 2 there is shown a preferred embodiment of how several separate zeolite units 50a–c may be arranged within a metal structure 52, which metal structure exhibits separate cells 54 for each individual zeolite unit 50a–c. In the shown embodiment there is shown nine separate cells 54 and consequently nine separate zeolite units 50a–c, but it is to be understood that the number of cells and units may be both smaller and greater, according to the above. The zeolite units 50a–c consist of narrow, elongated bodies which are arranged in close relation to each other, in order for heat exchanging to be facilitated between the separate units. If at one instance of the process the units 50a, for example, are operated for adsorption and accordingly the temperature rises in these units, and the units 50b are operated for the first step of desorption, and accordingly the temperature falls in these units, both the adsorption and the desorption process may be improved in terms of efficiency as heat exchanging takes place between the adsorbing and the desorbing units. At the same instance, the units 50c are operated for the second step of desorption, i.e. they are regenerated. The narrow shape of the zeolite units 50a–c greatly facilitates the heat transfer and counteracts the fact that zeolite exhibits a poor thermal conductivity. Moreover, the metal structure 52 enhances the heat transfer between the separate zeolite units 50a–c. As the adsorption and desorption process goes on, the units 50a, 50b and 50c, alternatingly operate for adsorption, the first step of desorption and the second step of desorption, respectively. Thanks to the heat exchanging, the adsorption and desorption reactions will be ameliorated and thus the alternating operating cycles may be rapid and efficient.

In FIG. 2, there is also symbolically shown how a zeolite unit 50a–c may be built up from a number of smaller pieces 51 which are stacked on each other to form the elongated bodies.

Figure 3E:
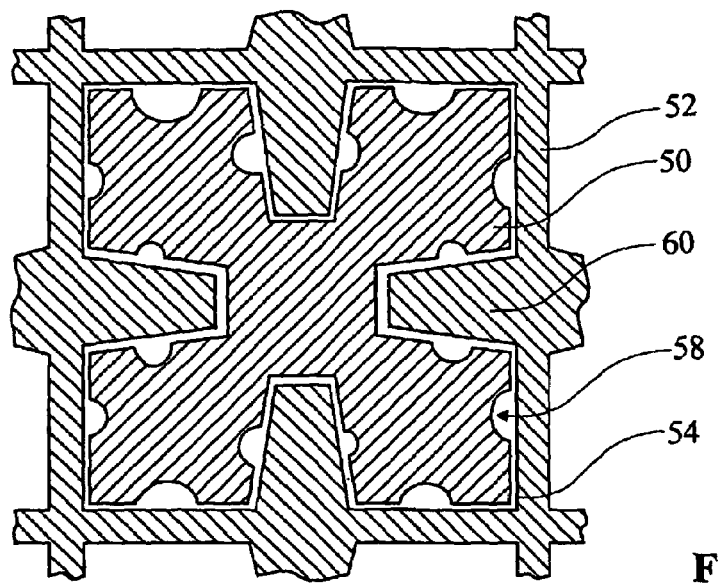

FIGS. 3A–F there is shown different conceivable cross-sectional designs of the zeolite units 50 and the metal structure 52 in which they are arranged. In FIG 3A it is shown an example of how the surface of the zeolite units 50 may be shaped to provide a peripheral length which is greater than the peripheral length of a rod with a circular cross-section, which rod has a cross-sectional area equal to the cross-sectional area of the zeolite unit. More specifically, the surface of each zeolite unit 50 exhibits a plurality of elongated grooves, preferably at least four grooves. Also, this advantageously provides for the possibility to arrange additional heat exchanging means, here in the form of metal ledges 60 which extend from the metal structure 52 and into the shaped surface of the zeolite units 50. In FIGS. 3A–F there is shown cross-sectional designs, i.e. quadratic designs, rectangular designs, designs shaped like a half-moon and triangular designs, respectively. It is to be understood that these designs merely constitute examples intended to show the wide variety of shapes that may be used.

As indicated in FIG. 2 and shown in more detail in FIGS. 3A–F, the zeolite units 50 may exhibit through-holes 56 for the passing through of gas (air, oxygen enriched air, oxygen, nitrogen enriched air or nitrogen). These through-holes 56 preferably form a honeycomb structure, as is known per se in zeolite technology. Alternatively or in combination, as shown in FIGS. 3D–E, there may be provided through channels 58 for the passing through of the gas between the outer surface of the zeolite units 50 and the metal structure 52. These through channels 58 may e.g. be constituted by the grooves mentioned above. It is to be understood that through channels 58 may be provided independent of the cross-sectional design of the zeolite units (or bodies) 50.

Figure 3F:
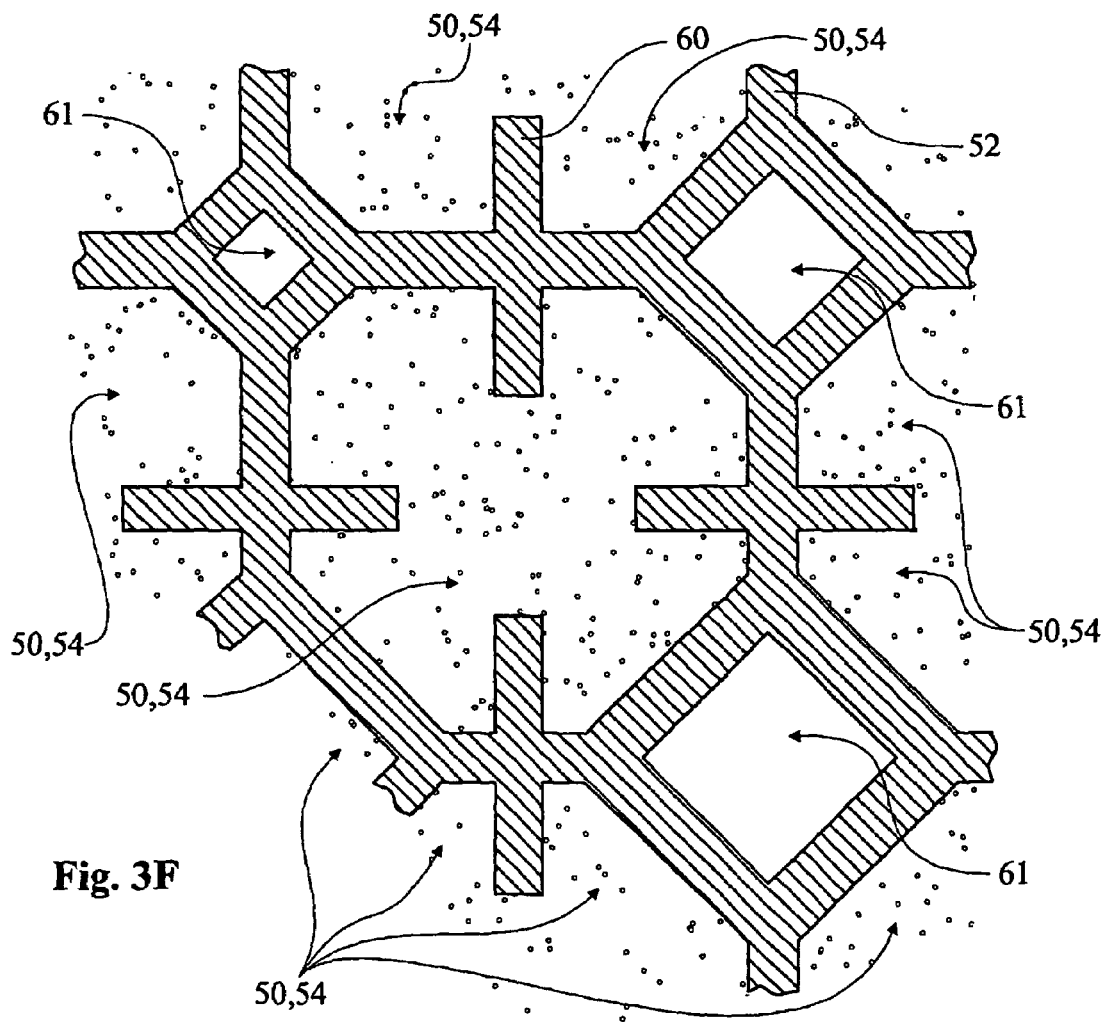

In FIG. 3F, there is shown how channels 61 may be provided in the metal structure 52, in-between the cells 54. These channels 61 may, as is shown, be of varying cross-sectional area. Their purpose is to constitute channels through the zeolite structure, for the heating medium or cooling medium. In this case it is preferred that all zeolite units 50 within the structure are operated in the same stage of the process at the same time. Hence, it is preferred that at least two zeolite structures of this type are arranged, one of them being operated for adsorption while the other is operated for desorption and vice versa.

In FIGS. 4A–D there is symbolically shown the four different stages A–D of a process according to the invention, in which adsorption during cooling and desorption dining heating is alternatingly performed. In the figure, open conduits are shown as full lines while closed conduits are shown as dotted lines. Two zeolite structures 18' and 18" each constitute a zeolite structure 18 e.g. as shown in FIG. 1, comprising at least three zeolite units, preferably a great number of zeolite units, respectively, although only two units 50 *a*, 50*b* being shown for sake of clarity. The arrangement of the zeolite structures 18 might preferably be according to the principles of FIG. 3F for achieving optimised heat transfer between the heating or cooling media and the zeolite. Moreover, lines 16, 20 and 22 as shown in FIG. 1 here comprise an individual branch for each zeolite structure 18', 18", which individual branches are denoted 16*a*, 16*b*, 20*a*, 20*b*, 22*a* and 22*b*, respectively.

In stage A, depicted in FIG. 4A, zeolite structure 18' is operated for adsorption and zeolite structure 18" is operated for the first step of desorption and hence conduits 16*a*, 20*b* and 22*a* are open, while conduits 16*b*, 20*a* and 22*b* are closed, by aid of valves 70, 72 and 74. A heating medium is supplied from a heating medium source 80 through valve 76 and conduits 62, 62*b* to directly or indirectly heat the desorbing zeolite structure 18". A cooling medium is supplied from a cooling medium source 82 through valve 78 and conduits 64, 64*a* to directly or indirectly cool the adsorbing zeolite structure 18'. Desorbed, nitrogen enriched, gas is withdrawn through conduits 20, 20*b* and oxygen enriched gas is withdrawn through conduits 22, 22*a*. In the figure there is also symbolically shown means 66 for heat exchanging (such as the metal structures 52 and 60 shown in FIGS. 2 and 3). The means 66 could also symbolist symbolize a heat pump.

In stage C, depicted in FIG. 4C, zeolite structure 18' is operated for the first step of desorption and zeolite structure 18" is operated for adsorption. Hence, conduits 16*b*, 20*a* and 22*b* are open, while conduits 16*a*, 20*b* and 22*a* are closed. A heating medium is supplied through conduits 62, 62*a* to directly or indirectly heat the desorbing zeolite structure 18' and a cooling medium is supplied through conduits 64, 64*b* to directly or indirectly cool the adsorbing zeolite structure 18". Desorbed, nitrogen enriched, gas is withdrawn through conduits 20, 20*a* and oxygen enriched gas is withdrawn through conduits 22, 22*b*.

In stage D, depicted in FIG. 4D, zeolite structure 18" is still operated for adsorption but zeolite structure 18' is operated for the second step of desorption. Hence, conduit 22*a* is open so that oxygen enriched air can drive off nitrogen from the zeolite of structure 18'.

After stage D, the cycle is repeated continuously. While the principle of the alternating operation has been shown with reference to a two unit zeolite structure, it is to be understood that the same principle could be used even if the zeolite structure comprises a great number of individual zeolite units. In that case, the alternating operation, including cooling and heating, could be controlled for optimised efficiency of the device and process. Also, it is to be understood that the principle shown in FIGS. 4A–D could be used without external heating and cooling media, whereby heat exchange means or heat pump 66 is used for the transferring of heat energy. In addition, the process described above can be performed without, with minor, or with major pressure differences between the adsorption and the desorption stage.

FIGS. 5A–C are showing the embodiment of the invention in which the zeolite structure 18 comprises a revolving unit. Here the structure 18 comprise a first side 18*a*, which is cooled by a cooling medium provided through conduit 64*a*, and a second side 18*b*, which is heated by a heating medium provided through conduit 62*b*. The revolving unit comprises at least two zeolite units 50*a*, 50*b*, arranged in series with partition walls 52 between them and preferably beat conductors 60 inside each zeolite units 50*a*, 50*b*. The revolving unit rotates preferably at increments corresponding to the number of zeolite units 50*a*, 50*b*, in the shown case in steps of 45° in the clockwise direction. In the cooled side 18*a*, air 16*a* enters the zeolite unit 50*a* which is last in line of the adsorbing units, i.e. which in next step is going to move into the desorbing side 18*b* of the structure. The air/gas 16*a* is led in counter current through the zeolite units 50*a* in the adsorbing, cooled side 18*a* of the structure 18. Between each of these units there is arranged a conduit 53*a* or the like to lead the air/gas between the units. When a zeolite unit 50*a* is conveniently saturated with nitrogen it is moved into the desorbing side 18*b*. The oxygen or oxygen enriched air is withdrawn through conduit 22*a*, through the last, into the adsorbing, preferably cooled side 18*a* of the structure 18, entered zeolite unit 50*a*. A portion of the oxygen or oxygen enriched air may be led into the zeolite unit 50*b* which is last in live of the desorbing units, i.e. which in next step is going to move into the adsorbing side 18*a* of the structure. This flushing oxygen or oxygen enriched air 22*b* is led in counter current though through the zeolite units 50 *b* in the desorbing, heated side 18*b*, of the structure 18. Between each of these units there is arranged a conduit 53*b* or the like to lead the air/gas between the units. When a zeolite unit 50*b* is conveniently desorbed it is moved into the adsorbing side 18*a*. The nitrogen or nitrogen enriched air is withdrawn through conduit 20*b*, from the last, into the desorbing, preferably heated side 18*b* of the structure 18, entered zeolite unit 50*b*.

In FIGS. 6A–C, the basic inventive idea is shown in greater detail, by example of a zeolite structure 18 comprising six zeolite units 50a–f. The same reference numerals have been used for details corresponding to details in FIGS. 1–5. It will be appreciated that the principle in FIGS. 6A–C is the same as in the embodiment shown in FIGS. 5A–C, the units 50a–f however preferably being stationary. Hence, the units 50a–f intermittently and operatively "shift position" in the process scheme by different conduits and valves (not shown) being in operation at different times. For sake of clarity however, at each time step of the process (FIG. 6A showing a first step. FIG. 6B showing the next, second step and FIG. 6C showing the third step directly following the second step), there is only shown the conduits in operation at that time. The degree of nitrogen saturation in the different zeolite units 50a–f is symbolically shown by N–NNN, where N is the lowest saturation and NNN is the highest saturation. In a corresponding manner, the concentration of oxygen in the gas that at the moment passes through the zeolite units is symbolised symbolized by B–O–OOO, where B is the lowest concentration, below the oxygen concentration of the incoming air 16a, O is close to the concentration in the incoming air 16a, and OOO is the highest concentration. The skilled man will have no problem in understanding the following steps of the process sequence, the zeolite units 50a–f constantly and intermittently shifting "saturation position" in the process sequence.

FIGS. 7A–B shows a prototype zeolite structure 18, arranged as a revolving unit. FIG. 7A is showing the structure 18 from above and in FIG. 7B, the structure 18 is illustrated in cross-section, symbolically envisaged as if it has been "unfolded" from a circular to straight structure, for sake of clarity. The same reference numerals have been used for details corresponding to details in FIGS. 1–6. Here, each individual zeolite units 50a, 50b is formed from a partly coiled tube which is tilled with a zeolite material. The tube walls 52 constitute "partition walls" between the individual units. Each zeolite tube unit 50a, 50b has an inlet coupling 83a and an outlet coupling 83b. The inlet and outlet couplings 83a, 83b of all zeolite tube units 50a, 50b are arranged in a lower, rotary plate 84. An upper, stationary plate 85 is provided with first couplings 87a and 87b for coupling of one of the inlet couplings 83a to the incoming air conduit 16a and one of the outlet couplings 83b to the outlet nitrogen or nitrogen enriched air conduit 20b, respectively. The upper, stationary plate 85 is also provided with second couplings 86a and 86b for coupling of one of the outlet couplings 83b to the outlet oxygen or oxygen enriched gas conduit 22a and one of the inlet couplings 83a to the inlet desorbing gas conduit 22b (e.g. an oxygen or oxygen enriched gas conduit 22b), respectively. For each step of the process sequence, the rotary plate 84 rotates incrementally so that each unit 50a, 50b moves one step, i.e. 60 degree in the shown embodiment having six units 50a, 50b. The adsorbing side 18a is preferably cooled by cooling means (not shown), e.g. a cold air fan and the desorbing side 18b is preferably heated by heating means (not shown). e.g. a hot air fan.

In FIGS. 6A–C, no meaning should be put in the fact that zeolite units 50a–c are shown as having gas inlet to the left and gas outlet to the right in the drawing, while zeolite unites 50d–f are shown as having gas inlet to the right and gas outlet to the left in the drawing. Actually, the gas direction (whether incoming air, depressurized gas or desorbing gas) could be switched or the same in each individual zeolite unit during the process sequence. Several possibilities are conceivable, as illustrated in Table 1.

TABLE 1

| Adsorbing units | | Desorbing units | |
|---|---|---|---|
| Individual units | Entire unit system | Individual units | Entire unit system |
| S | S | S | S |
| D | S | S | S |
| S | S | D | S |
| D | S | D | S |
| S | D | S | D |
| D | D | S | D |
| S | D | D | D |
| D | D | D | D |
| S | S | S | D |
| D | S | S | D |
| S | S | D | D |
| D | S | D | D |
| S | D | S | S |
| D | D | S | S |
| S | D | D | S |
| D | D | D | S |

For individual units, "S" means same gas direction in an individual unit all the time, independent of "position" within adsorbing and desorbing side, respectively, For individual units, "D" means different gas direction in two subsequent steps of the process sequence within adsorbing and desorbing side, respectively, For the entire zeolite unit system, within adsorbing and desorbing side, respectively, "S" means that the gas direction, within adsorbing and desorbing side, respectively, is the same for all units at a given step of the process sequence, For the entire zeolite unit system, within adsorbing and desorbing side, respectively, "D" means that the gas direction, within adsorbing and desorbing side, respectively, is different for all units in two subsequent steps of the process sequence, within adsorbing and desorbing side, respectively.

As an example, the embodiment shown in FIG. 5C is D/D/D/D and the embodiments shown in FIGS. 7A–B is S/S/S/S.

Similarly, several possibilities are conceivable regarding flow direction of cooling and heating medium in relation to the gas flow direction in the individual zeolite units, as illustrated in Table 2.

TABLE 2

| Adsorbing units | Desorbing units |
|---|---|
| Cocurrent | Cocurrent |
| Cocurrent | Countercurrent |
| Countercurrent | Cocurrent |
| Countercurrent | Countercurrent |
| Cross | Cocurrent |
| Cross | Countercurrent |
| Cocurrent | Cross |
| Countercurrent | Cross |
| Cross | Cross |

As is readily understood, "Cocurrent" means that the cooling or heating medium has the same direction through or along the zeolite unit, or units, as has the gas (whether incoming air, depressurised gas or desorbing gas). "Countercurrent" means that the cooling or heating medium has the opposite direction through or along the zeolite unit, or units, as has the gas. "Cross" means a direction of the cooling or heating medium which is neither cocurrent nor countercurrent, i.e. normally a crossdirectional flow, as is for example indicated in FIG. 5A. As regards FIG. 3F, it is understood that channels 61 may serve as means for a cocurrent or countercurrent (but not crossdirectional) heating or cooling medium flow. However, although not shown, it might be conceivable to form the metal structure 52 such that channels 61 are crossdirectional in relation to zeolite cells 54.

Instead of providing the heating and cooling medium such that it directly heats and cools, respectively, the zeolite units, it is conceivable to cool the incoming air 16a and heat the desorbing gas 22b, before these gas flows enter the zeolite units. Also, cooling and heating may be performed on gas in zeolite unit interlinking conduits 53a and 53b, respectively. (For reference numerals see FIGS. 5 and 6.) In this ease, the cooling and heating is categorised categorized as cocurrent. The gas flows may e.g. be cooled at least 5° C. and up to 100° C. below ambient temperature or heated at least 5° C. and up to 100° C. above ambient temperature.

The invention claimed is:

1. A device for producing oxygen or oxygen-enriched air, the device comprising:
a) a zeolite structure (18) of sorbent material having nitrogen and oxygen adsorbing properties, the zeolite structure comprising at least three zeolite units (50a–f) arranged to adsorb nitrogen from the air, and a means (70, 72, 74; 83a, 83b, 84, 85, 86, 86b, 87a, 87b) for intermittent operation of the zeolite units (50a–f) in a first and a second stage, the first stage comprising adsorption of nitrogen from the air and the second stage comprising desorption (20, 20; 20b) from the zeolite units (50a–f) of thus adsorbed nitrogen, wherein the means (70, 72, 74; 83a, 83b, 84, 85, 86, 86b, 87a, 87b) for intermittent operation are arranged to operate at least one but not all of the at least three zeolite units (50a–f) in the first adsorption stage and to operate the rest of the at least three zeolite units (50a–f) in the second desorption stage; and wherein a first conduit means (53a) is arranged to operatively and consecutively connect at least two of the three zeolite units (50a–f) to an inlet (10, 16, 16a, 16b) for incoming air for the first adsorption stage, and/or a second conduit means (53b) is arranged to operatively and consecutively connect at least two of the three zeolite units (50a–f) to an inlet (22a, 22b) for a released gas and/or a desorbing gas for the second desorption stage;
b) an inlet (10, 16, 16a, 16b) for incoming air, into and through the zeolite structure (18); and
c) a means for transferring heat energy from the zeolite units (50a–f) during the adsorption stage and to the zeolite units (50a–f) during the desorption stage, the means for transferring heat energy comprising a means for heat exchanging between the adsorbing and desorbing zeolite units (50a–f), the zeolite units (50a–f) being arranged in close relation to each other in order to accomplish said heat exchanging, and the zeolite units (50a–f) being arranged in a structure (52) of a heat conducting material, each zeolite unit (50a–f) being arranged in a cell (54) of its own in the structure (52) of heat conducting material, wherein each zeolite unit (50a–f) is shaped as an elongated body exhibiting a peripheral length which is greater than the peripheral length of a rod with a circular cross-section, which rod has a cross-sectional area equal to the cross-sectional area of the elongated bodies.

2. A device for producing oxygen or oxygen-enriched air, the device comprising:
a) a zeolite structure (18) of sorbent material having nitrogen and oxygen adsorbing properties, the zeolite structure comprising at least three zeolite units (50a–f) arranged to adsorb nitrogen from the air, and a means (70, 72, 74; 83a, 83b, 84, 85, 86, 86b, 87a, 87b) for intermittent operation of the zeolite units (50a–t) in a first and a second stage, the first stage comprising adsorption of nitrogen from the air and the second stage comprising desorption (20, 20; 20b) from the zeolite units (50a–f) of thus adsorbed nitrogen, wherein the means (70, 72, 74; 83a, 83b, 84, 85, 86, 86b, 87a, 87b) for intermittent operation are arranged to operate at least one but not all of the at least three zeolite units (50a–f) in the first adsorption stage and to operate the rest of the at least three zeolite units (50a–f) in the second desorption stage; and wherein a first conduit means (53a) is arranged to operatively and consecutively connect at least two of the three zeolite units (50a–f) to an inlet (10, 16, 16a, 16b) for incoming air for the first adsorption stage, and/or a second conduit means (53b) is arranged to operatively and consecutively connect at least two of the three zeolite units (50a–f) to an inlet (22a, 22b) for a released gas and/or a desorbing gas for the second desorption stage;
b) an inlet (10, 16, 16a, 16b) for incoming air, into and through the zeolite structure; and
c) a means for transferring heat energy from the zeolite units (50a–f) during the adsorption stage and to the zeolite units (50a–f) during the desorption stage, the means for transferring heat energy comprising a means for heat exchanging between the adsorbing and desorbing zeolite units (50a–f), the zeolite units (50a–f) being arranged in close relation to each other in order to accomplish said heat exchanging, the zeolite units (50a–f) arranged in a structure (52) of a heat conducting material, each zeolite unit (50a–t) arranged in a cell (54) of its own in the structure (52) of heat conducting material, wherein through channels (58) for passing through the air are arranged between the outer surface of the zeolite units (50a–f) and the structure (52) of heat conducting material.

3. A device for producing oxygen or oxygen-enriched air, the device comprising:
a) a zeolite structure (18) of sorbent material having nitrogen and oxygen adsorbing properties, the zeolite structure comprising at least three zeolite units (50a–f) arranged to adsorb nitrogen from the air, and a means (70, 72, 74; 83a, 83b, 84, 85, 86, 86b, 87a, 87b) for intermittent operation of the zeolite units (50a–f) in a first and a second stage, the first stage comprising adsorption of nitrogen from the air and the second stage comprising desorption (20, 20; 20b) from the zeolite units (50a–f) of thus adsorbed nitrogen, wherein the means (70, 72, 74; 83a, 83b, 84, 85, 86, 86b, 87a, 87b) for intermittent operation are arranged to operate at least one but not all of the at least three zeolite units (50a–f) in the first adsorption stage and to operate the rest of the at least three zeolite units (50a–f) in the second desorption stage; and wherein a first conduit means (53a) is arranged to operatively and consecutively connect at least two of the three zeolite units (50a–f) to an inlet (10, 16, 16a, 16b) for incoming air for the first adsorption stage, and/or a second conduit means (53b) is arranged to operatively and consecutively connect at least two of the three zeolite units (50a–f) to an inlet (22a, 22b) for a released gas and/or a desorbing gas for the second desorption stage;

b) an inlet (10, 16, 16a, 16b) for incoming air, into and through the zeolite structure; and c) a means for transferring heat energy from the zeolite units (50a–f) during the adsorption stage and to the zeolite units (50a–f) during the desorption stage, the means for transferring heat energy comprising a means for heat exchanging between the adsorbing and desorbing zeolite units (50a–f), the zeolite units (50a–f) being arranged in close relation to each other in order to accomplish said heat exchanging, the zeolite units (50a–f) arranged in a structure (52) of a heat conducting material, each zeolite unit (50a–f) arranged in a cell (54) of its own in the structure (52) of heat conducting material, wherein additional means (6) for the heat exchanging also being arranged within the structure (52) in the form of metal ledges (6) projecting from the heat conducting material and into the cells (54).

4. A device for producing oxygen or oxygen-enriched air, the device comprising:

a) a zeolite structure (18) of sorbent material having nitrogen and oxygen adsorbing properties, the zeolite structure comprising at least three zeolite units (50a–f) arranged to adsorb nitrogen from the air, and a means (70, 72, 74; 83a, 83b, 84, 85, 86, 86b, 87a, 87b) for intermittent operation of the zeolite units (50a–f) in a first and a second stage, the first stage comprising adsorption of nitrogen from the air and the second stage comprising desorption (20, 20; 20b) from the zeolite units (50a–f) of thus adsorbed nitrogen, wherein the means (70, 72, 74; 83a, 83b, 84, 85, 86, 86b, 87a, 87b) for intermittent operation are arranged to operate at least one but not all of the at least three zeolite units (50a–f) in the first adsorption stage and to operate the rest of the at least three zeolite units (50a–f) in the second desorption stage; and wherein a first conduit means (53a) is arranged to operatively and consecutively connect at least two of the three zeolite units (50a–f) to an inlet (10, 16, 16a, 16b) for incoming air for the first adsorption stage, and/or a second conduit means (53b) is arranged to operatively and consecutively connect at least two of the three zeolite units (50a–f) to an inlet (22a, 22b) for a released gas and/or a desorbing gas for the second desorption stage;

b) an inlet (10, 16, 16a, 16b) for incoming air, into and through the zeolite structure; and c) a means for transferring heat energy from the zeolite units (50a–f) during the adsorption stage and to the zeolite units (50a–f) during the desorption stage, the means for transferring heat energy comprising a means for heat exchanging between the adsorbing and desorbing zeolite units (50a–f), the zeolite units (50a–f) being arranged in close relation to each other in order to accomplish said heat exchanging, the zeolite units (50a–f) arranged in a structure (52) of a heat conducting material, each zeolite unit (50a–f) arranged in a cell (54) of its own in the structure (52) of heat conducting material, wherein the means for transferring heat energy comprises a cooling medium source (82) and a means (64, 64a, 64b) for cooling the zeolite unit (50a–f) by the cooling medium, as well as a heating medium source (80) and means (62, 62a, 62b) for heating the zeolite unite by the heating medium, through channels (61) for passing through the heating or cooling medium through the zeolite structure (18) arranged in the structure (52) of heat conducting material.

5. A device for producing oxygen or oxygen-enriched air, the device comprising:

a) a zeolite structure (18) of sorbent material having nitrogen and oxygen adsorbing properties, the zeolite structure (18) comprising at least three zeolite units (50a–f) arranged to adsorb nitrogen from the air, and a means (70, 72, 74; 83a, 83b, 84, 85, 86, 86b, 87a, 87b) for intermittent operation of the zeolite units (50a–f) in a first and a second stage, the first stage comprising adsorption of nitrogen from the air and the second stage comprising desorption (20, 20; 20b) from the zeolite units (50a–f) of thus adsorbed nitrogen, wherein the means (70, 72, 74; 83a, 83b, 84, 85, 86, 86b, 87a, 87b) for intermittent operation are arranged to operate at least one but not all of the at least three zeolite units (50a–f) in the first adsorption stage and to operate the rest of the at least three zeolite units (50a–f) in the second desorption stage; and wherein a first conduit means (53a) is arranged to operatively and consecutively connect at least two of the three zeolite units (50a–f) to an inlet (10, 16, 16a, 16b) for incoming air for the first adsorption stage, and/or a second conduit means (53b) is arranged to operatively and consecutively connect at least two of the three zeolite units (50a–f) to an inlet (22a, 22b) for a released gas and/or a desorbing gas for the second desorption stage;

b) an inlet (10, 16, 16a, 16b) for incoming air, into and through the zeolite structure; and c) a means for transferring heat energy from the zeolite units (50a–f) during the adsorption stage and to the zeolite units (50a–f) during the desorption stage, the means for transferring heat energy comprising a means for heat exchanging between the adsorbing and desorbing zeolite units (50a–f), the zeolite units (50a–f) being arranged in close relation to each other in order to accomplish said heat exchanging, the zeolite units (50a–f) arranged in a structure (52) of a heat conducting material, each zeolite unit (50a–f) arranged in a cell (54) of its own in the structure (52) of heat conducting material, wherein the zeolite units (50a–f) exhibit a honeycomb structure, by which through-holes (56) are provided in the zeolite unit for the passing through of the air.

* * * * *